United States Patent
Byun et al.

(10) Patent No.: US 11,468,906 B2
(45) Date of Patent: Oct. 11, 2022

(54) METHOD AND SYSTEM FOR MIXING MULTIPLE SOUND SOURCES

(71) Applicant: NAVER CORPORATION, Seongnam-si (KR)

(72) Inventors: Woo-sik Byun, Seongnam-si (KR); Sang Don Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 108 days.

(21) Appl. No.: 17/075,325

(22) Filed: Oct. 20, 2020

(65) Prior Publication Data

US 2021/0118459 A1 Apr. 22, 2021

(30) Foreign Application Priority Data

Oct. 21, 2019 (KR) .................. 10-2019-0130939

(51) Int. Cl.
*G10L 21/00* (2013.01)
*G06F 3/16* (2006.01)
*G11B 27/031* (2006.01)

(52) U.S. Cl.
CPC .............. *G10L 21/00* (2013.01); *G06F 3/16* (2013.01); *G11B 27/031* (2013.01)

(58) Field of Classification Search
CPC .......... G10L 21/00; G06F 3/16; G11B 27/031
See application file for complete search history.

(56) References Cited

U.S. PATENT DOCUMENTS

| | | | | |
|---|---|---|---|---|
| 6,757,573 | B1 * | 6/2004 | Ledoux | G06F 3/16 |
| | | | | 381/61 |
| 2013/0212341 | A1 * | 8/2013 | Tardif | G06F 3/0656 |
| | | | | 711/154 |
| 2014/0180684 | A1 * | 6/2014 | Strub | G06F 3/165 |
| | | | | 704/211 |

FOREIGN PATENT DOCUMENTS

| | | |
|---|---|---|
| JP | 2013048352 | 3/2013 |
| KR | 1020040065783 | 2/2006 |
| KR | 101558199 | 10/2015 |
| KR | 101558203 | 10/2015 |

\* cited by examiner

*Primary Examiner* — Fan S Tsang
*Assistant Examiner* — David Siegel
(74) *Attorney, Agent, or Firm* — Greer Burns & Crain Ltd.

(57) ABSTRACT

A multiple sound source mixing method includes dividing a plurality of sound source data into segments each with a desired length; sequentially inputting sound source data of a corresponding segment for each segment through a desired number of nodes with respect to the plurality of sound source data and mixing the input sound source data into a single piece of sound source data; and concatenating the sound source data mixed for the respective segments.

15 Claims, 10 Drawing Sheets

FIG. 10 ved on Oct. 21, 2019, in the
METHOD AND SYSTEM FOR MIXING MULTIPLE SOUND SOURCES

CROSS-REFERENCE TO RELATED APPLICATION(S)

This U.S. non-provisional application claims the benefit of priority under 35 U.S.C. § 119 to Korean Patent Application No. 10-2019-0130939 filed on Oct. 21, 2019, in the Korean Intellectual Property Office (KIPO), the entire contents of which are incorporated herein by reference.

BACKGROUND OF THE INVENTION

Field of Invention

One or more example embodiments of the following description relate to technology for mixing sound source data.

Description of Related Art

Digital audio technology that started with the development of compact discs (CDs) needs to process an audio mixer using a digital signal processor (DSP) to perform an efficient mixing task, configure a reliable system, and produce a high-quality audio signal.

Compared to audio based on a previous analog scheme, a digital audio scheme using a DSP may implement the additional performance enhancement through reprogramming of software and may implement a sophisticated filter with high performance and robustness against noise obtainable using a digital signal processing scheme.

As an example of sound source mixing technology, Korean Patent Registration No. 10-1558199, registered on Oct. 8, 2015, describes a digital sound source mixing apparatus having a control function through a graphical user interface (GUI), such that an output and mixing task through a path selection of sound source signals input to an input channel of a multichannel and various control tasks for sound source signals during this process may be performed through a dedicated GUI program and a control screen thereof.

BRIEF SUMMARY OF THE INVENTION

One or more example embodiments provide a method and system that may mix a plurality of sound source data with a minimum amount of resources.

One or more example embodiments provide a method and system that may simultaneously mix a maximum amount of sound source data with a limited number of nodes.

According to an aspect of at least one example embodiment, there is provided a multiple sound source mixing method implemented by a computer system including at least one processor configured to execute computer-readable instructions included in a memory, the method including, by the at least one processor, dividing a plurality of sound source data into segments each with a desired length; sequentially inputting sound source data of a corresponding segment for each segment through a desired number of nodes with respect to the plurality of sound source data and mixing the input sound source data into a single piece of sound source data; and concatenating the sound source data mixed for the respective segments. A number of nodes is determined to be less than to a number of sound source data to be mixed.

The mixing may include determining a segment length for division based on the number of sound source data to be mixed; and dividing the plurality of sound source data into segments each with the determined length.

The dividing may include dividing the plurality of sound source data into segments each with a predetermined fixed unit length.

A remaining node excluding a single node from among the desired number of nodes may serve to sequentially insert and input sound source data of each segment one by one and the single node may serve to accumulate the sound source data sequentially input through the remaining node and mix the accumulated sound source data into a single piece of sound source data.

The mixing may include sequentially inputting sound source data of a corresponding segment one by one through a remaining node excluding a single node from among the desired number of nodes with respect to a single segment; and accumulating and thereby mixing the sound source data sequentially input through the remaining node, through the single node.

The number of nodes may be determined to be less than the number of sound source data to be mixed based on the number of sound source data to be mixed.

The number of nodes may be determined to be less than the number of sound source data to be mixed based on system performance.

The concatenating may include completing a final mixing result in which the plurality of sound source data is mixed into a single piece of sound source data by sequentially concatenating the sound source data mixed for the respective segments in segment order.

According to an aspect of at least one example embodiment, there is provided a multiple sound source mixing method implemented by a computer system including at least one processor configured to execute computer-readable instructions included in a memory, the method including, by the at least one processor, dividing a plurality of sound source data into segments each with a desired length; sequentially inputting sound source data of a corresponding segment for each segment through a desired number of nodes with respect to the plurality of sound source data and mixing the input sound source data into a single piece of sound source data; and concatenating the sound source data mixed for the respective segments. A remaining node excluding a single node from among the desired number of nodes serves to sequentially insert and input sound source data of each segment one by one and the single node serves to accumulate the sound source data sequentially input through the remaining node and mix the accumulated sound source data into a single piece of sound source data.

According to an aspect of at least one example embodiment, there is provided a non-transitory computer-readable record medium storing instructions that, when executed by a processor, cause the processor to perform the multiple sound source mixing method.

According to an aspect of at least one example embodiment, there is provided a computer system including at least one processor configured to execute computer-readable instructions included in a memory. The at least one processor includes a segment divider configured to divide a plurality of sound source data into segments each with a desired length; and a sound source mixer configured to sequentially input sound source data of a corresponding segment for each segment through a desired number of nodes with respect to the plurality of sound source data and mix the input sound source data into a single piece of sound source data and then to concatenate the sound source data mixed for the respective segments, and a number of nodes is determined to be less than to a number of sound source data to be mixed.

According to some example embodiments, it is possible to minimize an amount of resources unnecessarily used for multiple sound source mixing by simultaneously mixing multiple sound source data using a minimum amount of resources.

According to some example embodiments, it is possible to implement real-time audio processing by simultaneously mixing a maximum amount of sound source data without restriction on a number of sound sources using a limited number of input nodes.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments of the present invention will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units, components and/or devices, such as a processor, nodes, interfaces, according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units, components and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for simultaneously mixing multiple sound sources.

The example embodiments including the disclosures described herein may simultaneously mix a maximum amount of sound source data within determined resources, thereby minimizing unnecessary use of resources and further efficiently implementing real-time audio processing.

Figure 1:
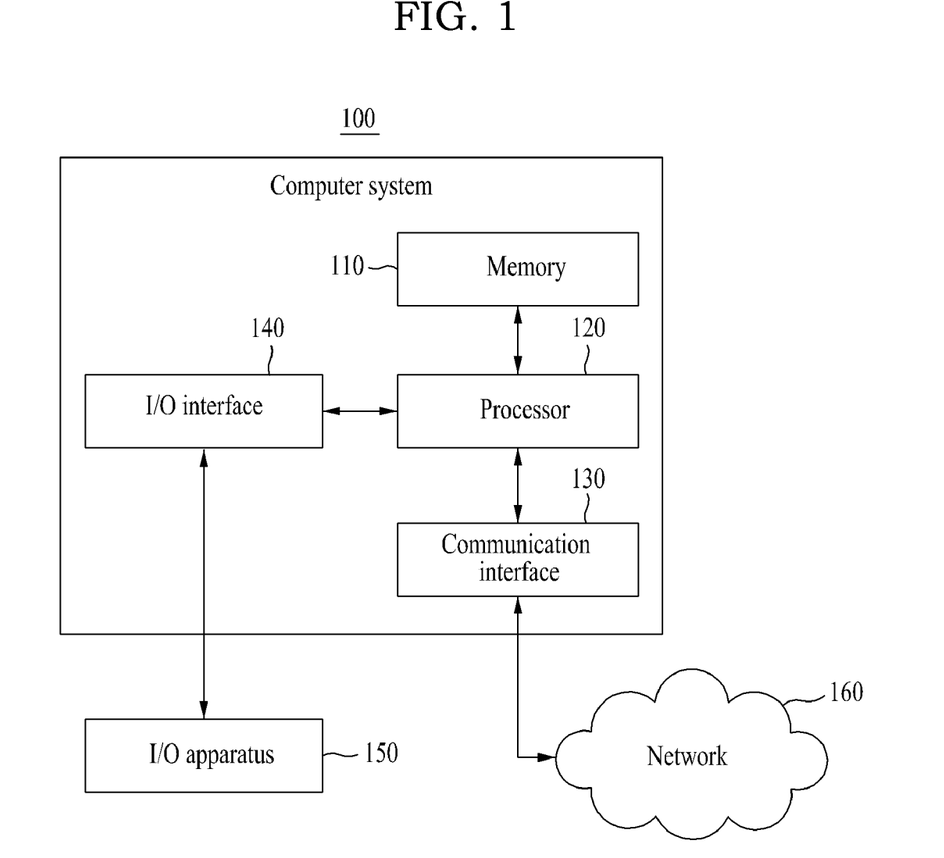
FIG. 1 illustrates an example of an internal configuration of a computer system according to an example embodiment.

FIG. 1 is a diagram illustrating an example of a computer system according to an example embodiment. For example, a multiple sound source mixing system according to example embodiments may be implemented by a computer system 100 of FIG. 1.

Referring to FIG. 1, the computer system 100 may include a memory 110, a processor 120, a communication interface 130, and an input/output (I/O) interface 140 as components for performing a multiple sound source mixing method according to example embodiments.

The memory 110 may include a permanent mass storage device, such as random access memory (RAM), a read only memory (ROM), and a disk drive, as a non-transitory computer-readable storage medium. The permanent mass storage device, such as ROM and disk drive, may be included in the computer system 100 as a permanent storage device separate from the memory 110. Also, an OS and at least one program code may be stored in the memory 110. The software components may be loaded to the memory 110 from another non-transitory computer-readable medium separate from the memory 110. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 110 through the communication interface 130 instead of, or in addition to, the non-transitory computer-readable storage medium. For example, software components may be loaded to the memory 110 of the computer system 100 based on a computer program installed by files received over the network 160.

The processor 120 may be configured to process computer-readable instructions of a computer program by performing basic arithmetic operations, logic operations, and I/O operations. The computer-readable instructions may be provided from the memory 110 or the communication interface 130 to the processor 120. For example, the processor 120 may be configured to execute received instructions in response to the program code stored in the storage device, such as the memory 110.

The communication interface 130 may provide a function for communication between the computer system 100 and another apparatus, for example over the network 160. For example, the processor 120 of the electronic system 100 may transfer data, a file, a request or an instruction created based on the program code stored in the storage device, such as the memory 110, to other apparatuses over the network 160 under the control of the communication interface 130. Inversely, a signal, an instruction, data, a file, etc., from other apparatuses may be received at the computer system 100 through the communication module 130 of the computer system 100 by going through the network 160. For example, a signal, an instruction, data, etc., received through the communication interface 130 may be transferred to the processor 120 or the memory 110, and a file, etc., may be stored in a storage medium, for example, the permanent mass storage device, further includable in the computer system 100.

The communication scheme is not particularly limited and may include a communication method using a near field communication between devices as well as a communication method using a communication network, for example, a mobile communication network, the wired Internet, the wireless Internet, a broadcasting network, etc., which may be included in the network 160. For example, the network 160 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 160 may include at least one of network topologies that include a bus network, a star network, a ring network, a mesh network, a star-bus network, a tree or hierarchical network, and the like. However, these are only examples and the example embodiments are not limited thereto.

The I/O interface 140 may be a device used for interface with an I/O apparatus 150. For example, an input device of the I/O interface 140 may include a device, such as a microphone, a keyboard, a camera, a mouse, and the like, and an output device of the I/O interface 140 may include a device, such as a display, a speaker, and the like. As another example, the I/O interface 140 may be a device for interfacing with an apparatus in which an input function and an output function are integrated into a single function, such as a touchscreen. The I/O apparatus 150 may be configured as a single apparatus with the computer system 100.

According to other example embodiments, the computer system 100 may include a number of components greater than or less than the number of components shown in FIG. 1. However, there is no need to clearly illustrate many components known in the related art. For example, the computer system 100 may include at least a portion of the I/O apparatus 150, or may further include other components, for example, a transceiver, a camera, various types of sensors, a database (DB), and the like.

In the case of designing a sound source mixing system, a number of nodes capable of simultaneously performing mixing needs to be limited. The example embodiments relate to multiple sound source mixing technology capable of simultaneously mixing infinite sound sources using a minimum number of nodes. As known in the art, a node is a resource object that is programmed to receive a sound source for mixing in a sound source mixing system.

The multiple sound source mixing technology relates to mixing the respective different sound source data into a single piece of sound source data.

To mix multiple sound sources played at the same time, corresponding multiple sound source data may be mixed into a single piece of sound source data by generating a number of input nodes based on a number of overlapping sound sources. For example, performance music may be produced as a single sound source by using pulse code modulation (PCM) files classified for the respective scales.

Figure 2:
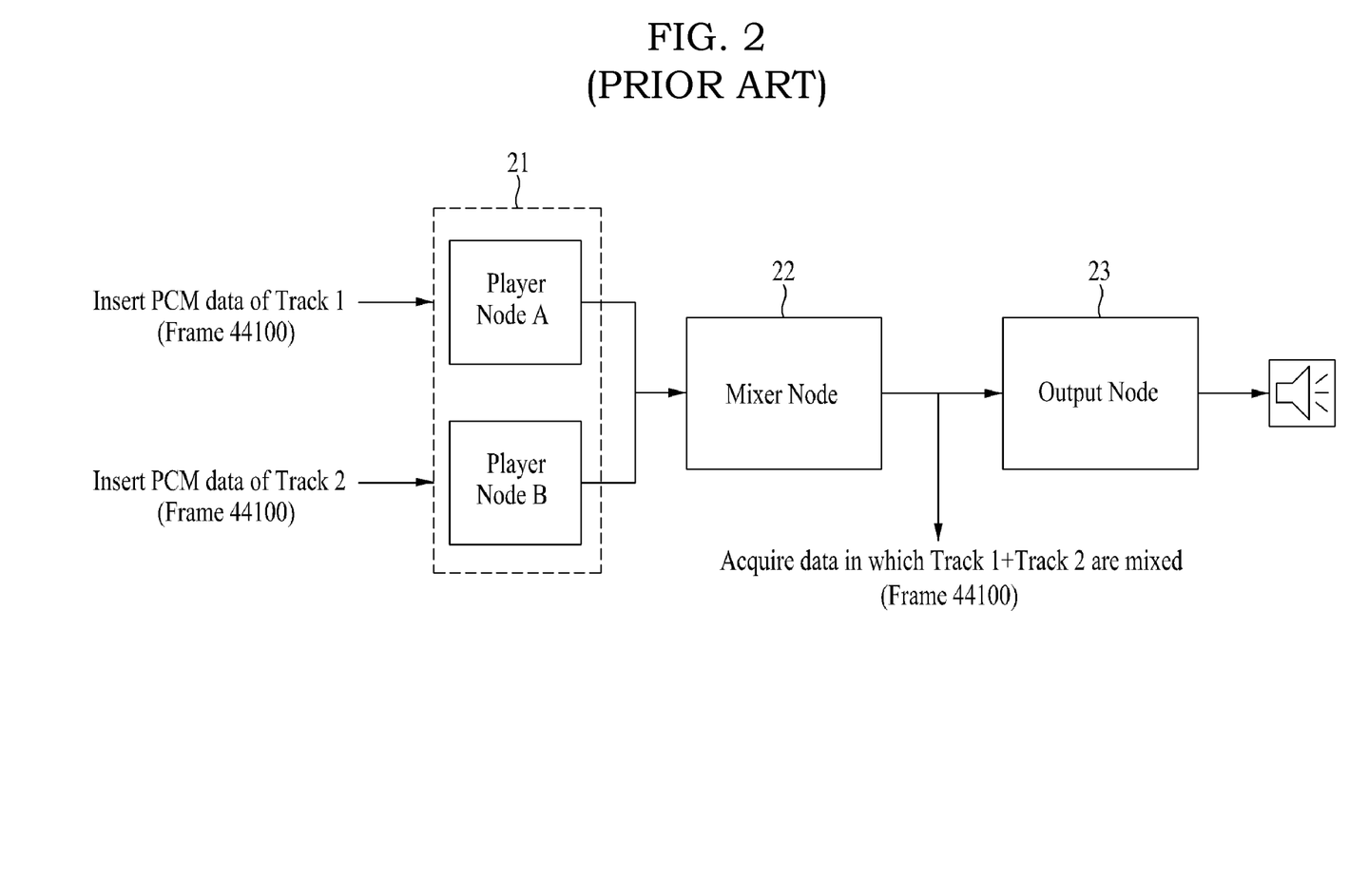
FIG. 2 illustrates an example of a conventional multiple sound source mixing process.

Referring to FIG. 2, in the case of mixing PCM sound source data of the respective different two sound tracks (Track 1 and Track 2), the PCM sound source data may be inserted using two input nodes 21, respectively. The PCM sound source data received from the two input nodes 21 may be mixed into a single piece of PCM sound source through a mixer node 22 and output through an output node 23.

Figure 3:
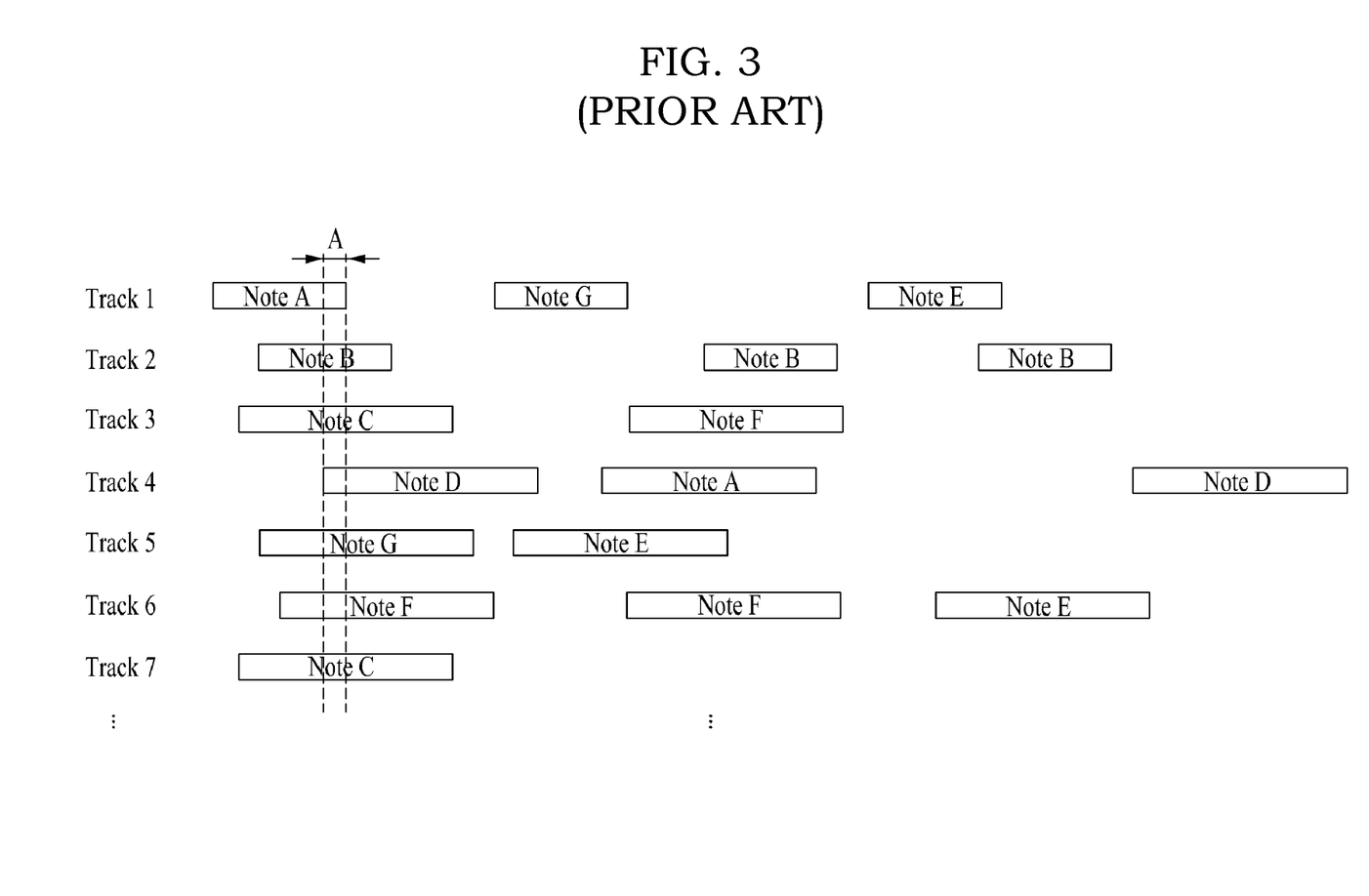
FIGS. 3 and 4 illustrate examples of a conventional sound source mixing structure.
Figure 4:
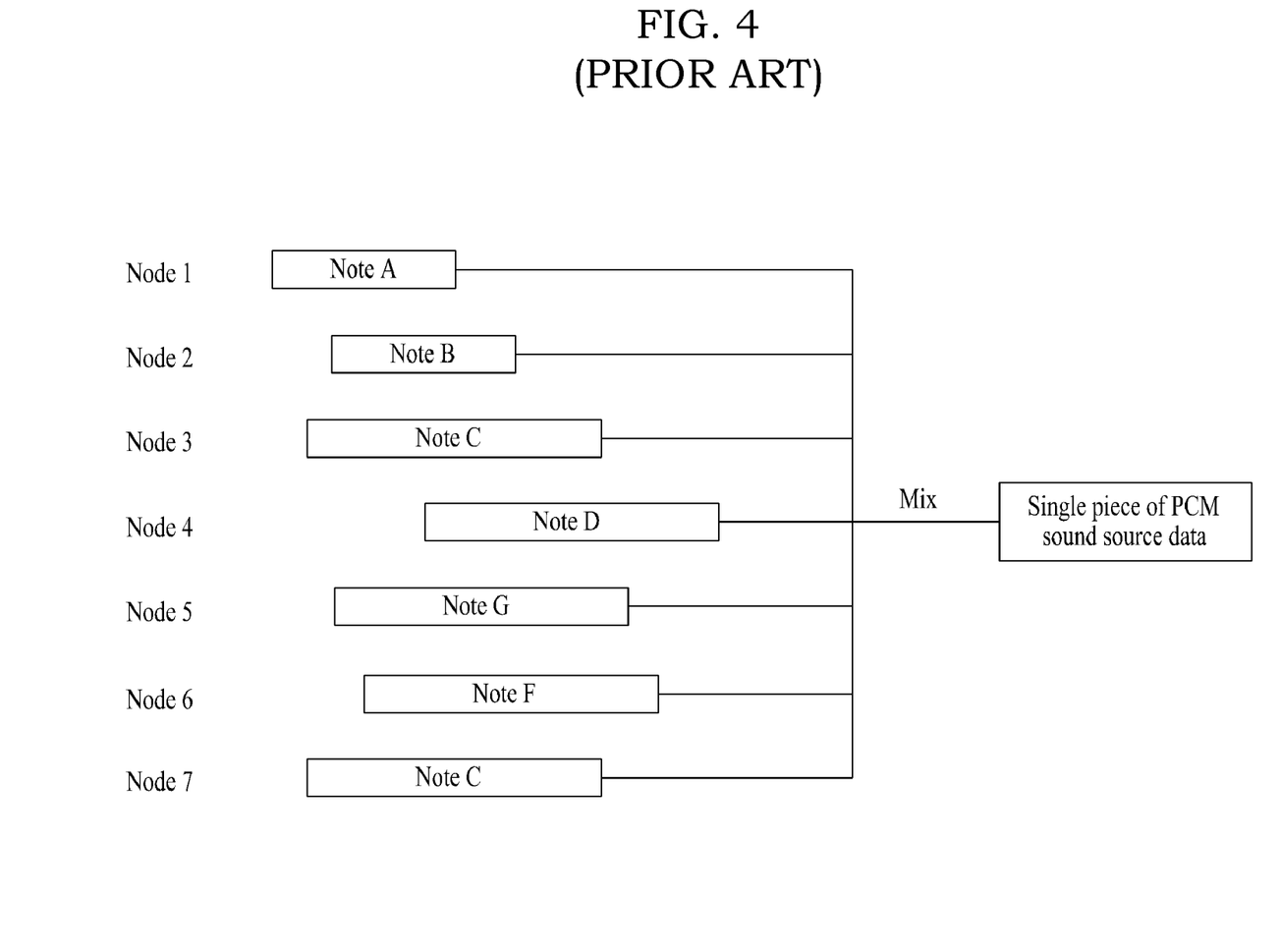

Referring to FIG. 3, in the case of mixing seven sound tracks (hereinafter referred to as "tracks"), for example, Track 1 to Track 7, including the respective different PCM sound source data into a single piece of PCM sound source data, a number of input nodes may be increased based on a number of overlapping sound sources and used for mixing in a general mixing structure. A number of input nodes corresponding to a number of overlapping sound sources based on a segment, for example, Segment A, in which a largest number of sound sources overlap are required. Since the number of overlapping sound sources in the corresponding Segment A is seven, seven input nodes, for example, Node 1 to Node 7 of FIG. 4, are required to mix into a single piece of PCM sound source data 4.

In the case of Track 7 among the seven tracks in FIG. 3, Track 7 has only a single note. However, if there is even one overlapping segment, a single input node is required and thus, a separate node needs to be generated.

In an existing sound source mixing structure, a number of input nodes needs to increase according to an increase in a number of overlapping sound sources. That is, if 100 sound sources are overlapping in a specific segment, it indicates that 100 input nodes are required.

In the case of mixing the sound of playing instruments with dozens of scales at a time, such as an orchestra, a number of sound sources simultaneously played ranges from dozens to thousands. Therefore, resources may be unnecessarily used to increase a number of nodes to correspond to a number of overlapping sound sources.

Further, in the case of real-time audio processing, a number of input nodes needs to dynamically increase or decrease. However, using an existing sound source mixing structure, it is difficult to adjust a number of nodes in the middle of audio processing. In the case of real-time audio processing, if it is impossible to adjust the number of nodes flexibly, the number of nodes needs to be increased sufficiently in an arbitrary manner.

The example embodiments provide multiple sound source mixing technology that may simultaneously mix sound sources without restriction on a number of sound sources, using a predetermined (or, alternatively, desired) number of nodes.

Figure 5:
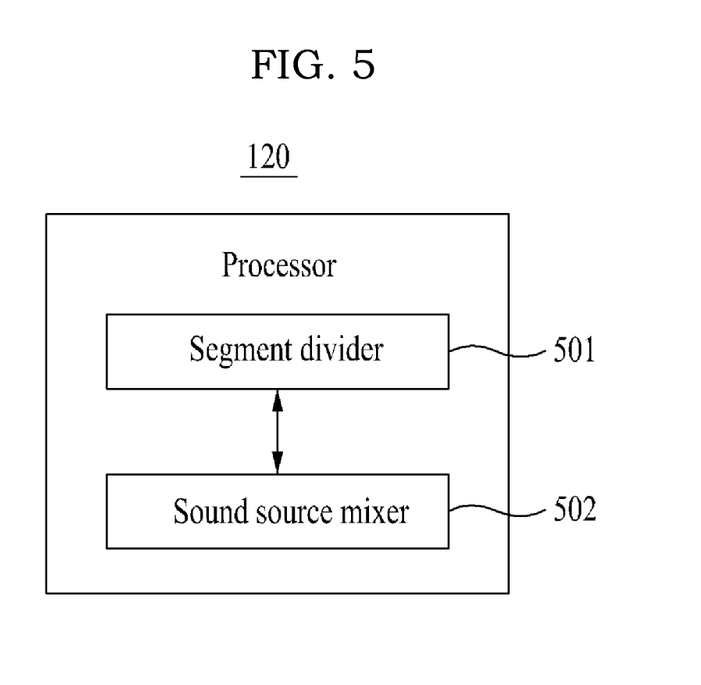
FIG. 5 is a diagram illustrating an example of components includable in a processor of a computer system according to one embodiment.
Figure 6:
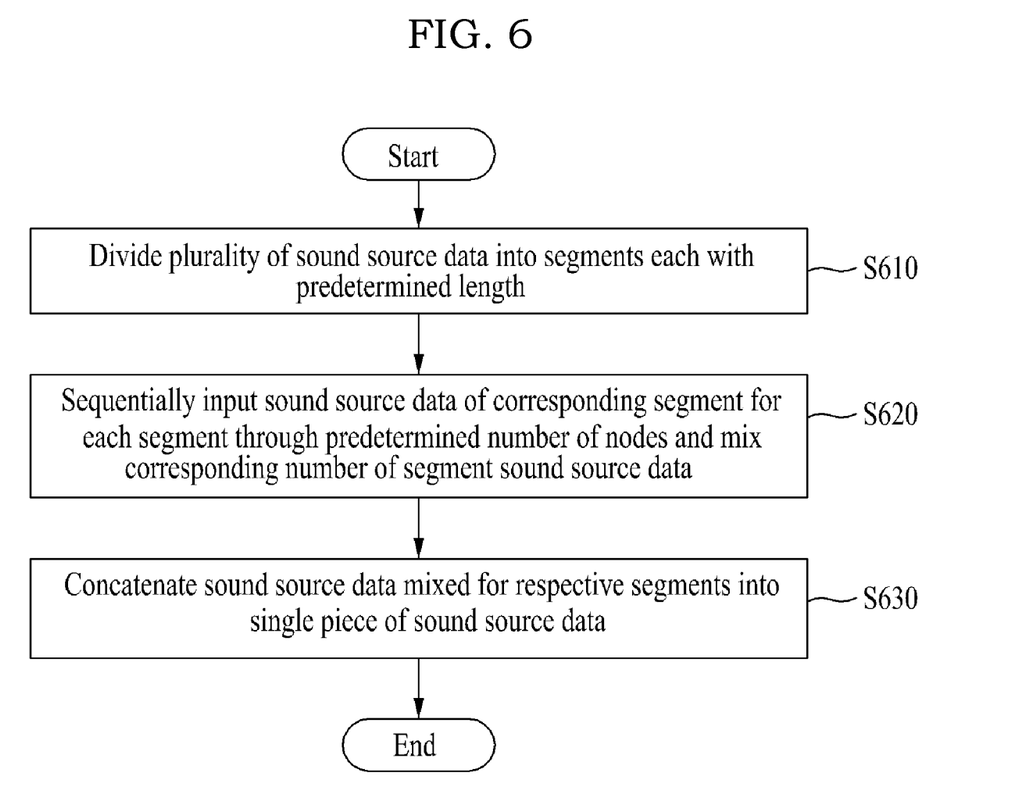
FIG. 6 is a flowchart illustrating a multiple sound source mixing method performed by a computer system according to an embodiment.

FIG. 5 is a diagram illustrating an example of a component includable in a processor of a computer system according to an example embodiment, and FIG. 6 is a flowchart illustrating an example of a multiple sound source mixing method performed by a computer system according to an example embodiment.

Referring to FIG. 5, the processor 120 may include a segment divider 501 and a sound source mixer 502. Components of the processor 120 may be representations of different functions performed by the processor 120 in response to a control instruction provided from at least one program code. For example, the segment divider 501 may be used as a functional representation that controls the computer system 100 such that the processor 120 may divide a sound source into segments each with a predetermined (or, alternatively, desired) length.

The processor 120 and the components of the processor 120 may perform operations S610 to S630 included in the multiple sound source mixing method of FIG. 6. For example, the processor 120 and the components of the processor 120 may be configured to execute an instruction according to at least one program code and a code of an OS included in the memory 110. Here, the at least one program code may correspond to a code of a program implemented to process the multiple sound source mixing method.

The multiple sound source mixing method may not necessarily be performed in the illustrated order. A portion of operations may be omitted from or an additional process may be further included in the multiple sound source mixing method.

The processor 120 may load, to the memory 110, a program code stored in a program file for the multiple sound source mixing method. For example, the program file for the multiple sound source mixing method may be stored in a permanent storage device separate from the memory 110 and the processor 120 may control the computer system 100 such that the program code may be loaded from the program file stored in the permanent storage device to the memory 110 through a bus. Here, the processor 120 and the segment divider 501 and the sound source mixer 502 included in the processor 120 may be different functional representations of the processor 120 to perform the following operations S610 to S630 by executing an instruction of a corresponding portion in the program code loaded to the memory 110. To perform operations S610 to S630, the processor 120 and the components of the processor 120 may directly process an operation or control the computer system 100 in response to the control instruction.

Referring to FIG. 6, in operation S610, the segment divider 501 may divide a plurality of different PCM sound source data to be mixed into segments each with a predetermined (or, alternatively, desired) length. The sound source date may be divided by applying a known segmentation technique and into intervals of unit length in chronological order. For example, the segment divider 501 may divide the plurality of PCM sound source data into segments each with a fixed unit length. As another example, the segment divider 501 may determine a segment length for division based on a number of PCM sound source data and may divide the PCM sound source data into segments each with the determined length. Thus, when there is an increase in the number of PCM sound sources to be mixed, the segment divider 501 may determine the segment length to be relatively short, and when there is a decrease in the number of PCM sound sources, the segment divider 501 may determine the segment length to be relatively long. For example, if there are 10 sound sources to mix, each sound source may be divided into 1 second intervals with a unit length of 1 second, and if there are 5 sound sources to mix, each sound source may be divided into 2 second intervals with a unit length of 2 seconds.

In operation S620, the sound source mixer 502 may sequentially input PCM sound source data (hereinafter, also referred to as segment sound source data) of a corresponding segment for each segment through a predetermined (or, alternatively, desired) number of nodes with respect to the plurality of PCM sound source data and may sequentially mix a corresponding number of segment sound source data into a single piece of segment sound source data. A number of input nodes required for sound source mixing may be determined to be less than a number of PCM sound sources to be mixed. For example, a minimum number of input nodes that guarantees the basic performance may be determined through a sound source mixing performance test according to a number of PCM sound source data. The sound source mixing performance may be measured, for example, based on the time required for sound source mixing. Alternatively, the minimum number of input nodes may be determined based on system performance, i.e., at a level belonging to an acceptable time range. System performance may also mean the performance of components related to sound source mixing, for example processor performance. The higher the performance, the fewer input nodes are necessary. That is, the sound source mixer 502 may sequentially input and mix PCM sound source data of a corresponding segment for each segment through a minimum number of input nodes with respect to the plurality of PCM sound source data. Here, the sound source mixer 502 may mix all of the PCM sound source data of a single segment and then may mix PCM sound source data of a subsequent segment.

In operation S630, the sound source mixer 502 may sequentially concatenate the PCM sound source data mixed for the respective segments in segment order. Through this, the sound source mixer 502 may acquire a final mixing result in which the plurality of PCM sound source data is mixed into a single piece of PCM sound source data.

FIGS. 7 to 10 illustrate examples of a multiple sound source mixing process according to an example embodiment.

Hereinafter, a process of mixing multiple sound sources using two nodes as a minimum number of input nodes is described. However, it is provided as an example only and a number of input nodes used for multiple sound source mixing is not limited thereto.

Figure 7:
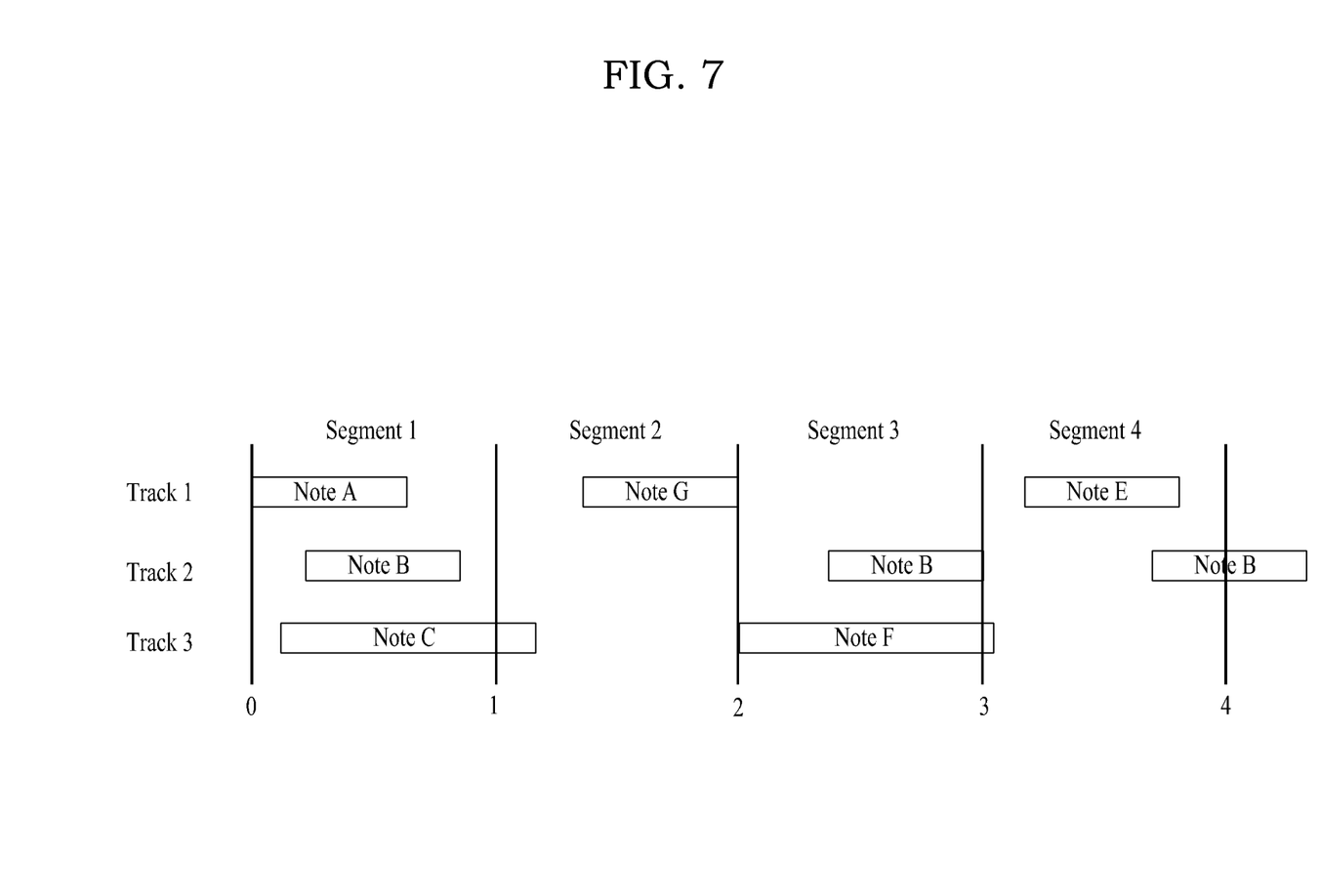
FIGS. 7 to 10 illustrate examples of a multiple sound source mixing process using a minimum number of input nodes according to one embodiment.

Referring to FIG. 7, in the case of mixing three tracks, for example, Tracks 1, 2, and 3, as the respective different PCM sound source data, the segment divider 501 may divide the three tracks into Segments 1, 2, 3, and 4, each with the same length.

The sound source mixer 502 may mix segment sound source data for each track into a single piece of segment sound source data using two nodes based on a segment.

Here, one of the two nodes, for example, Node 2, may serve to sequentially insert and input sound source data to be mixed and the other node, for example, Node 1, may serve to accumulate the sound source data sequentially input through Node 2 and mix the accumulated sound source data into a single piece of sound source data.

Figure 8:
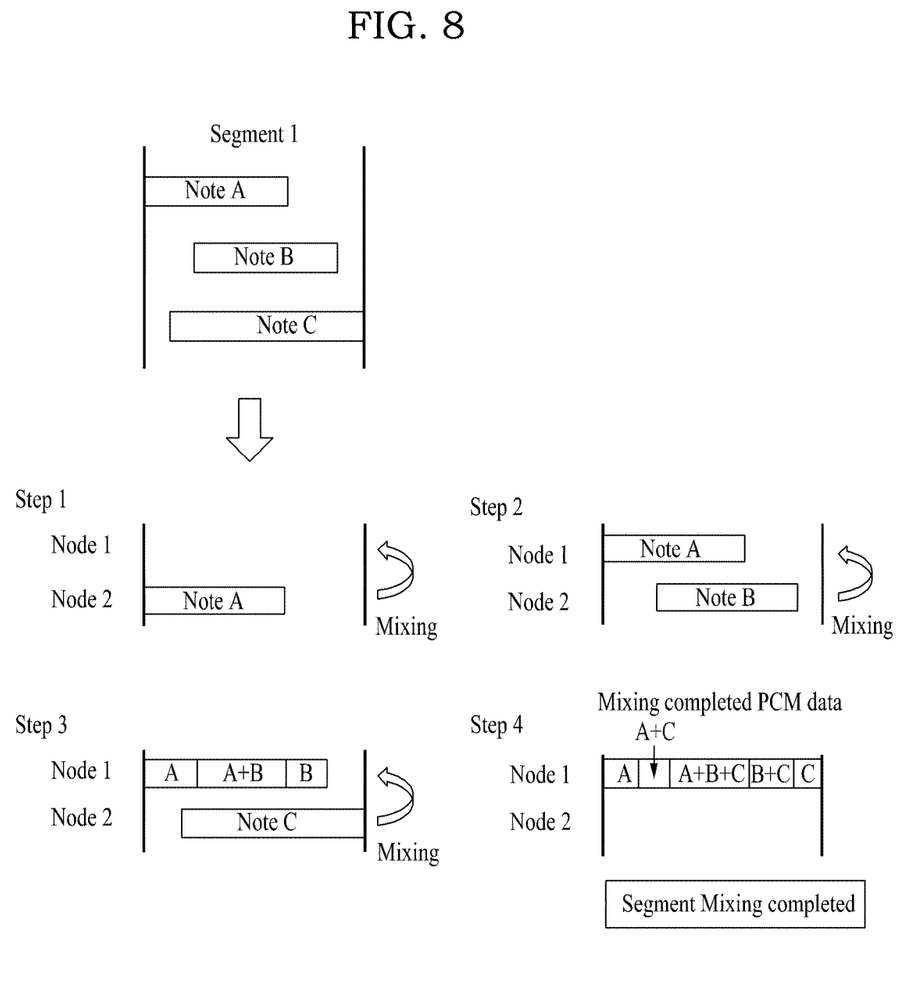

Referring to FIG. 8, the sound source mixer 502 may sequentially input first segment sound source data of each track one by one through Node 2 with respect to a first segment (Segment 1) and may accumulate the first segment sound source data sequentially input through Node 2 through Node 1 and thereby mix the accumulated first segment sound source data into a single piece of sound source data. The sound source mixer 502 may sequentially input the first segment sound source data of each track through two nodes, that is, Node 1 and Node 2, with respect to the first segment (Segment 1) (Step 1, Step 2, and Step 3), may sequentially mix the first segment sound data two at a time, and may acquire mixed sound source data of the first segment (Segment 1) (Step 4). That is, the sound source mixer 502 may acquire a single piece of sound source data as a mixing result of Segment 1 by sequentially inputting sound source data of Segment 1 of Track 1 and sound source data of Segment 1 of Track 2 and by mixing an intermediate mixing result and sound source data of Segment 1 of Track 3 input in subsequent order.

Figure 9:
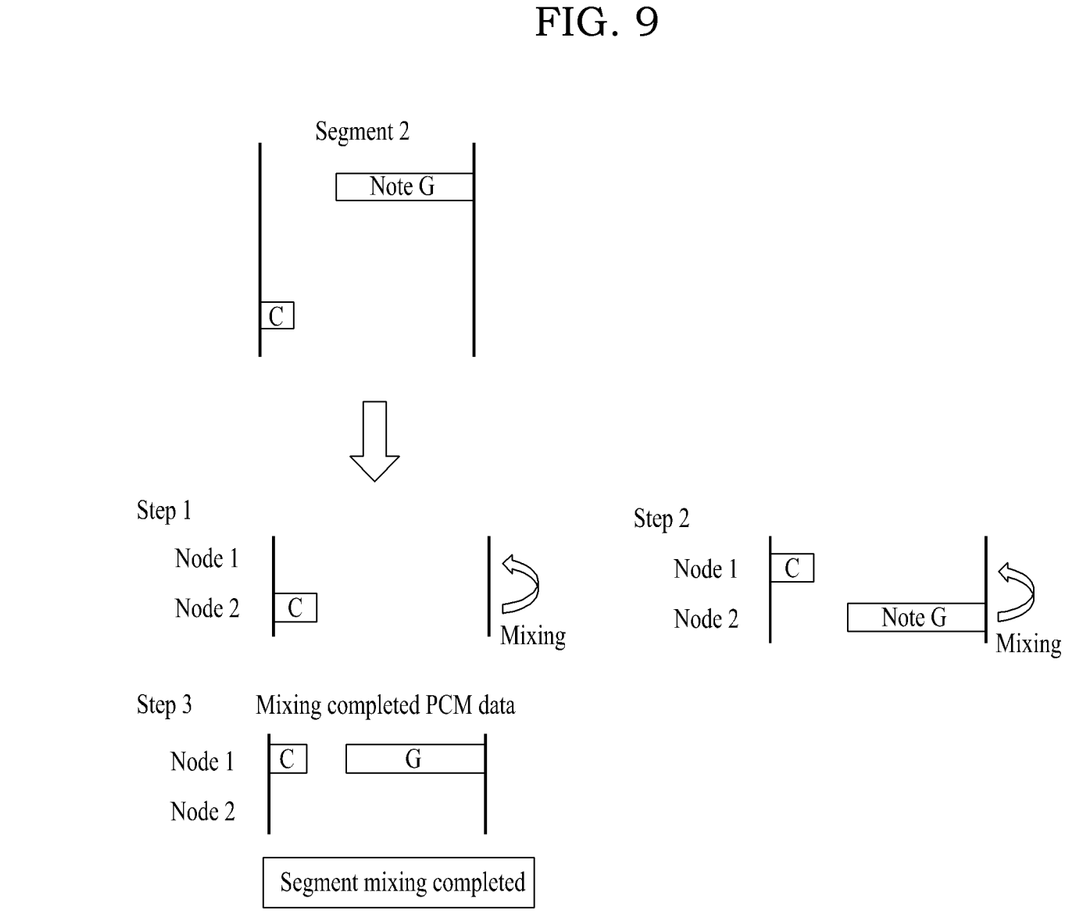

Referring to FIG. 9, once mixing of the first segment (Segment 1) is completed, the sound source mixer 502 may sequentially input second segment sound source data of each track through two nodes with respect to a second segment (Segment 2) that is a subsequent segment of the first segment (Segment 1) (Step 1 and Step 2) and may acquire mixed sound source data of the second segment (Segment 2) (Step 3).

By applying the same method to a third segment (Segment 3) and a fourth segment (Segment 4) successive to the first segment (Segment 1) and the second segment (Segment 2), the sound source mixer 502 may mix segment sound source data of the respective tracks into a single piece of segment sound source data for each segment.

Figure 10:
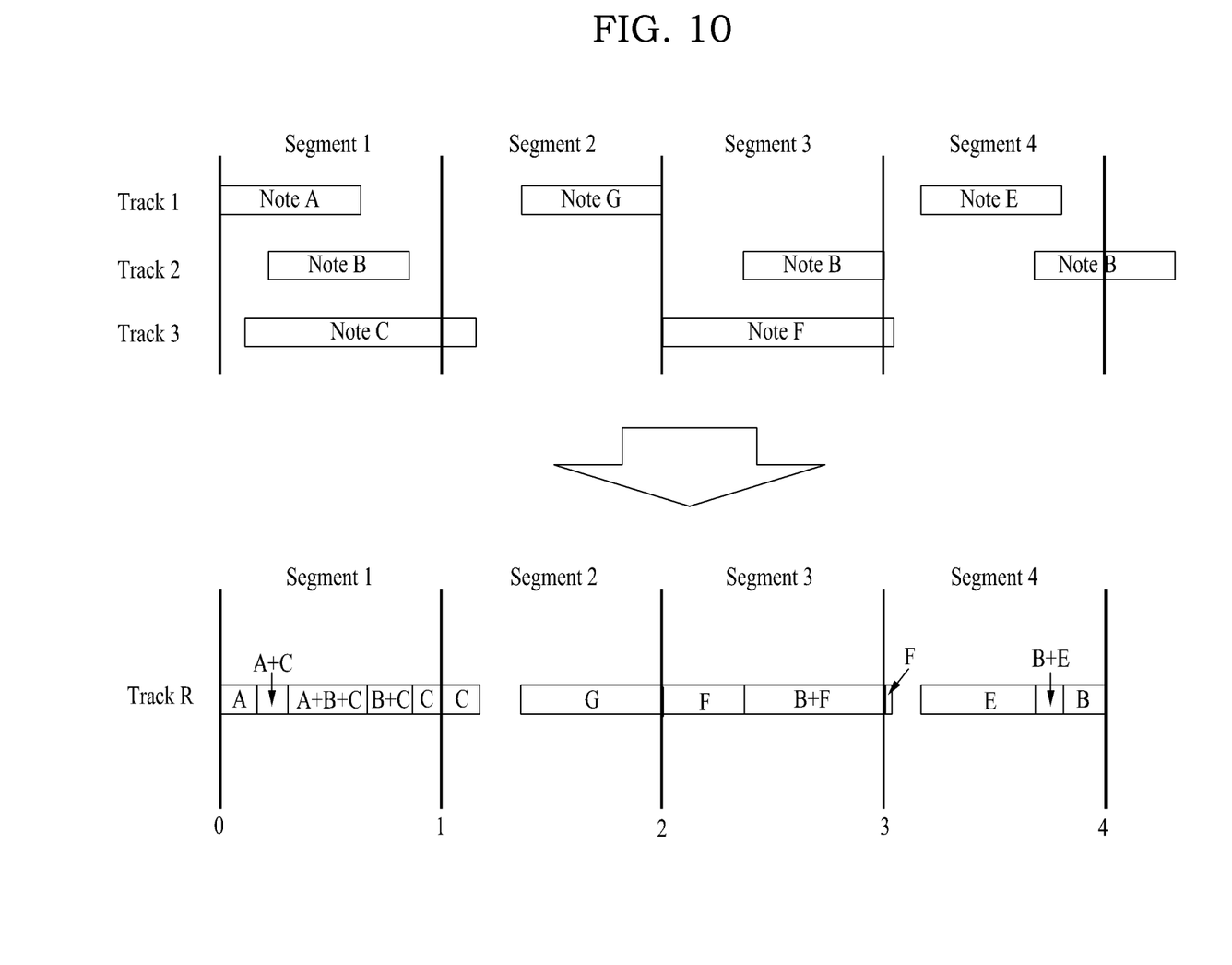

Referring to FIG. 10, once mixing of sound source data for each segment, for example, for each of Segments 1, 2, 3, and 4, is completed with respect to three tracks, for example, Tracks 1, 2, and 3, to be mixed, the sound source mixer 502 may complete a final result track (Track R) in which the three tracks, for example, Track 1, 2, and 3, are mixed into a single PCM sound source data by concatenating sound source data mixed for the respective segments.

According to some example embodiments, it is possible to minimize an amount of resources unnecessarily used for multiple sound source mixing by simultaneously mixing multiple sound source data using a minimum amount of resources. In particular, according to some example embodiments, it is possible to implement real-time audio processing by simultaneously mixing a maximum amount of sound source data without restriction on a number of sound sources using a limited number of input nodes.

The systems and/or apparatuses described herein may be implemented using hardware components, software components, and/or a combination thereof. For example, a processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts.

Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by Appstore that distributes applications or a site, a server, and the like that supplies and distributes other various types of software. Examples of program instructions include both machine code, such as produced by a compiler, and files containing higher level code that may be executed by the computer using an interpreter.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multiple sound source mixing method implemented by a computer system comprising at least one processor configured to execute computer-readable instructions included in a memory, the method comprising:
   dividing a plurality of sound source data in parallel tracks into a plurality of segments each with a desired length;
   sequentially inputting sound source data in each of the parallel tracks of a corresponding segment through a desired number of nodes and mixing the sequentially input sound source data into a single piece of sound source data for each of the plurality of segments; and
   concatenating the mixed single piece of sound source data in the respective plurality of segments,
   wherein the desired number of nodes is determined to be less than a number of the parallel tracks.

2. The method of claim 1, wherein the desired length of the segments is determined based on the number of the parallel tracks.

3. The method of claim 1, wherein the plurality of sound source data is divided into the plurality of segments each with a predetermined fixed unit length.

4. The method of claim 1, wherein the mixing of the input sound source data comprises:
   sequentially inputting sound source data in each of the parallel tracks of a corresponding segment one by one through a remaining node from among the desired number of nodes with respect to a single segment; and
   accumulating and thereby mixing the sound source data in the parallel tracks sequentially input through the remaining node, through a single node from among the desired number of nodes.

5. The method of claim 1, wherein the desired number of nodes is determined to be less than the number of the parallel tracks based on a number of the plurality of sound source data to be mixed.

6. The method of claim 1, wherein the desired number of nodes is determined to be less than the number of the parallel tracks based on system performance.

7. The method of claim 1, wherein the mixed single piece of sound source date in the plurality of segments are sequentially concatenated in a segment order.

8. A multiple sound source mixing method implemented by a computer system comprising at least one processor configured to execute computer-readable instructions included in a memory, the method comprising:
   dividing a plurality of sound source data in parallel tracks into a plurality of segments each with a desired length;
   sequentially inputting sound source data in each of the parallel tracks of a corresponding segment through a desired number of nodes and mixing the sequentially input sound source data into a single piece of sound source data for each of the plurality of segments; and
   concatenating the mixed single piece of sound source data in the respective plurality of segments,
   wherein a remaining node; from among the desired number of nodes serves to sequentially insert and input the sound source data in parallel tracks of each segment one by one, and a single node from among the desired number of nodes serves to accumulate the sound source data sequentially input through the remaining node and mix the accumulated sound source data into the single piece of sound source data.

9. A computer system comprising:
   at least one processor configured to execute computer-readable instructions included in a memory,
   wherein the at least one processor comprises:
   a segment divider configured to divide a plurality of sound source data in parallel tracks into a plurality of segments each with a desired length; and
   a sound source mixer configured to sequentially input sound source data in each of the parallel tracks of a corresponding segment for each segment through a desired number of nodes and mix the sequentially input sound source data into a single piece of sound source data, and then to concatenate the mixed single piece of sound source data for each of the plurality of segments,
   wherein the desired number of nodes is determined to be less than to a number of the parallel tracks.

10. The computer system of claim 9, wherein the desired length of the segments is determined based on the number of the parallel tracks.

11. The computer system of claim 9, wherein the plurality of sound source data is divided into the plurality of segments each with a predetermined fixed unit length.

12. The computer system of claim 9, wherein the sound source mixer is configured to
   sequentially input sound source data in each of the parallel tracks of a corresponding segment one by one through a remaining node from among the desired number of nodes with respect to a single segment, and
   accumulate and thereby mix the sound source data in the parallel tracks sequentially input through the remaining node, through a single node from among the desired number o nodes.

13. The computer system of claim 9, wherein the desired number of nodes is determined to be less than the number of the parallel tracks based on the number of sound source data to be mixed.

14. The computer system of claim 9, wherein the desired number of nodes is determined to be less than the number of the parallel tracks based on system performance.

15. The computer system of claim 9, wherein the mixed single piece of sound source data in the plurality segments are sequentially concatenated in a segment order.

* * * * *